United States Patent [19]

Vickers

[11] Patent Number: 4,863,326
[45] Date of Patent: Sep. 5, 1989

[54] CAPTIVE FASTENER

[75] Inventor: James H. Vickers, Middletown township, Del. County, Pa.

[73] Assignee: Southco, Inc., Concordville, Pa.

[21] Appl. No.: 940,526

[22] Filed: Dec. 11, 1986

[51] Int. Cl.$^4$ ............................................. F16B 23/00
[52] U.S. Cl. ..................................... 411/105; 403/118; 403/407.1; 411/108; 411/396; 411/402
[58] Field of Search ................ 411/103, 105, 107–109, 411/352, 353, 999, 402, 403, 396, 383, 384; 403/118, 407.1; 292/251

[56] References Cited

U.S. PATENT DOCUMENTS

| 87,747 | 3/1869 | Woods | 411/402 X |
|---|---|---|---|
| 2,345,650 | 4/1944 | Attwood | 411/105 X |
| 2,737,222 | 3/1956 | Becker | 411/105 |
| 2,991,904 | 7/1961 | Carideo | 292/251 |
| 3,093,222 | 6/1963 | Christoffersen et al. | 411/999 X |
| 3,785,670 | 1/1974 | Smith | 411/403 X |
| 3,896,867 | 7/1975 | Gill et al. | 411/353 |
| 4,125,140 | 11/1978 | Basile | 411/999 X |
| 4,253,509 | 3/1981 | Collett | 411/383 X |
| 4,432,680 | 2/1984 | Molina | 411/105 X |
| 4,609,314 | 9/1986 | Metz | 411/105 X |

FOREIGN PATENT DOCUMENTS 546 of 1888 United Kingdom ................ 292/251
828194 2/1960 United Kingdom ................ 411/105

Primary Examiner—Lloyd A. Gall
Attorney, Agent, or Firm—Paul and Paul

[57] ABSTRACT

A captive fastener for securing two closure members together comprises a crew component adapted to be affixed to one of the closure members and a complimentary nut component adapted to be affixed to the other closure member. The screw component comprises a housing, a drive sleeve disposed within the housing for rotational movement therein, and a screw member in operatinal engagement with the drive sleeve whereby the screw member is axially movable between extended and retracted positions relative to the housing in response to the rotational movement of the drive sleeve. The nut component comprises a shell, a nut member disposed within the shell for limited axial and radial movement therein and fixed against rotation, and biasing means for urging against the axial movement of the nut member. The radial and axial movement of the nut member facilitates the alignment and engagement of the screw member with the nut member to eliminate binding when the closure members are assembled. The screw component is designed so that the screw member is fully retracted upon disassembly and also to permit a flush-mounting with the closure member during operation of the fastener.

20 Claims, 4 Drawing Sheets

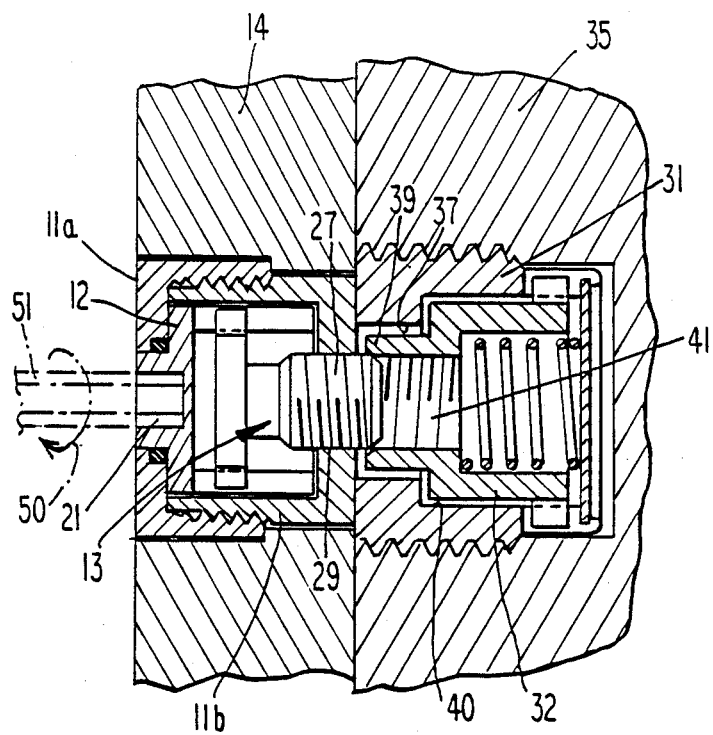
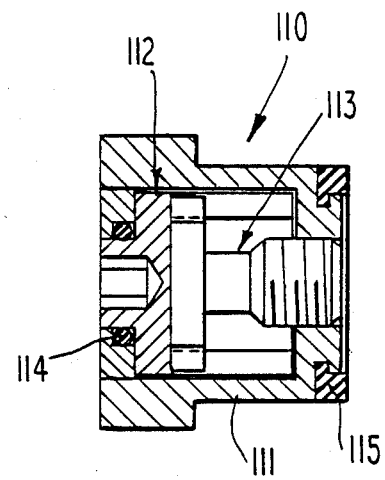
Fig. 7
Fig. 9
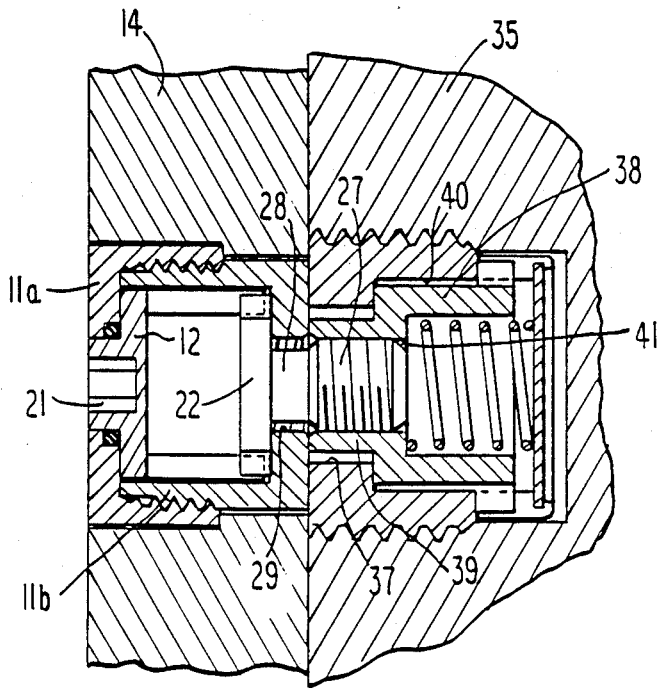
Fig. 8

CAPTIVE FASTENER

BACKGROUND OF THE INVENTION

This invention relates generally to fastening devices for securing two closure members together wherein the components of the fastener are retained in the respective closure members. More specifically, this invention relates to captive fasteners of the screw or threaded type.

Many types of captive fasteners are generally known in the art. Captive fasteners derive their name from the observation that the components of the fastener are retained, or "captivated", in the respective closure members. These fasteners are generally considered desirable because they prevent the loss of parts when the fastener is disassembled and also because they facilitate the reassembly of the fastener. Captive fasteners are particularly desirable for use in situations where access to one of the components of the fastener is difficult or impossible once the closure members are brought together.

One type of captive fastener that has been found particularly useful is the screw or threaded type which essentially consists of a male threaded member, such as a screw or bolt, and a female threaded member, such as a nut. This type of captive fastener is widely used on access panels for electrical and mechanical equipment which are periodically removed for purposes of inspection, adjustment, or repair. Typically, the screw component is retained by the access panel and the nut component is retained in the frame of the panel opening and is fixed against rotation so that no tool is required at that end of the fastener.

The screw component of known captive screw fasteners may be loosely retained in the panel or may be driven axially by means of a threaded component secured to the access panel. In the first mentioned arrangement, the screw component often protrudes from the inside surface of the panel when the panel is removed. The protruding screws are disadvantageous in that they often catch on clothing, wires, or the like and thus interfere with the removal and replacement of the panel. Another disadvantage of this arrangement is that the head of the screw often protrudes from the outside surface of the panel when it is assembled and thus prevents a flush panel surface when such an appearance is necessary or otherwise desirable.

In the other arrangement, that is, where the screw component is driven axially by means of a threaded member, difficulties arise in the installation and operation of the fastener. The difficulties in operation are due to the binding effect that occurs when the threads of the screw do not precisely align with the threads of the nut. This phenomenon is perhaps best observed by attempting to thread a screw through two separate nuts simultaneously. Unless the threads of the second nut are exactly aligned wit the threads of the first nut to form a continuous threaded helix, the screw threads will not mate properly with the threads of the second nut, and binding will occur.

In order to eliminate the binding effect in such an arrangement, the nut component of he fastener must be installed in the frame in a precise orientation to form a continuous threaded helix. Obviously, this precise installation of the nut component requires considerable skill and is thus time consuming and costly.

SUMMARY OF THE INVENTION

The present invention provides a novel captive screw fastener that overcomes the above-mentioned disadvantages of known captive screw fasteners. Briefly, the present invention provides a captive screw fastener having a screw component comprising a housing, a drive sleeve rotatably disposed in the housing, and a screw member axially movable between extended and retracted positions relative to the housing in response to the rotational movement of the drive sleeve, and a nut component comprising a shell, a nut member disposed within the shell for limited radial and axial movement therein, and means for biasing the nut in a direction toward the screw component. The screw component is flush mounted with the outside surface of the closure member, such as a panel, and remains flush during operation. The screw member retracts completely into the housing upon disassembly and thus does not interfere with the removal or replacement of the closure member. The novel construction of the nut subassembly allows the nut member to "float" in the axial and radial directions to eliminate the binding problem.

Accordingly, it is an object of the invention to provide a novel captive fastener of the screw or threaded type.

It is another object of the invention to provide a captive screw fastener in which the screw component remains flush with the outside surface of the closure member.

It is another object of the invention to provide a captive screw fastener in which the screw member retracts into a housing when the closure member is removed.

It is still another object of the invention to provide a captive screw fastener which is sealed against moisture and other environmental contaminants.

It is another object of the invention to provide a captive screw fastener in which the nut member is biased toward the screw and floats in the radial direction to eliminate binding.

It is a further object of the invention to provide a captive screw fastener in which the nut member floats in the axial direction to eliminate binding.

It is another object of the invention to accomplish the above objects in a captive screw fastener in which the internal operating components can be removed or replaced without damage to the closure members.

It is a further object of the invention to accomplish the above objects in a captive screw fastener of minimal axial dimension.

It is another object of the invention to accomplish the above objects in a captive screw fastener suitable for use in a wide variety of structural materials.

These and other objects of the invention will become apparent upon a further reading of the detailed description of the embodiments with reference to the drawings, and the appended claims.

BRIEF DESCRIPTION OF THE DRAWINGS

FIG. 7 is a sectional view of the captive screw fastener of the present invention, partially fastened, illustrating the axial movement of screw member and the float of the nut member.

FIG. 8 is a sectional view of the captive screw fastener of the present invention, shown in the fully fastened condition.

FIG. 9 is a sectional view of another embodiment of the screw component of the present invention, in which the screw housing is permanently sealed.

DETAILED DESCRIPTION OF THE EMBODIMENTS

Figure 1:
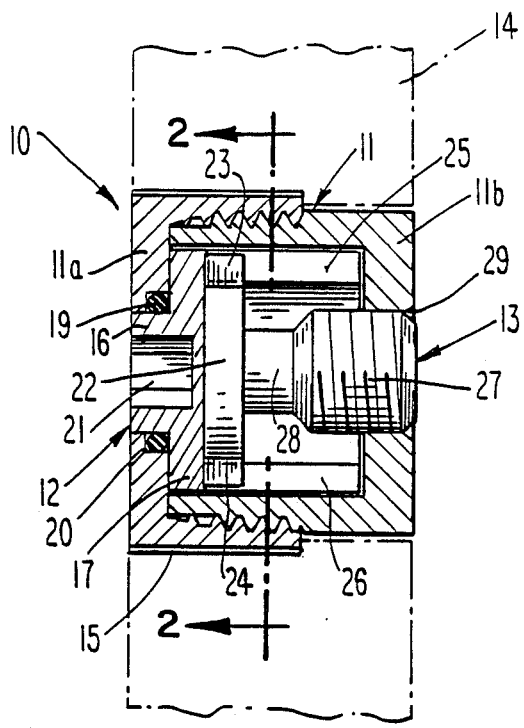
FIG. 1 is a sectional view of one embodiment of the screw component of the invention retained within an outer closure member.
Figure 2:
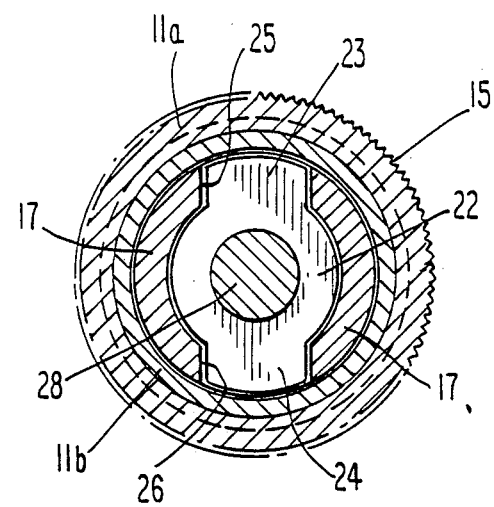
FIG. 2 a sectional view of the screw component of FIG. 1, taken along line 2—2 of FIG. 1.
Figure 3:
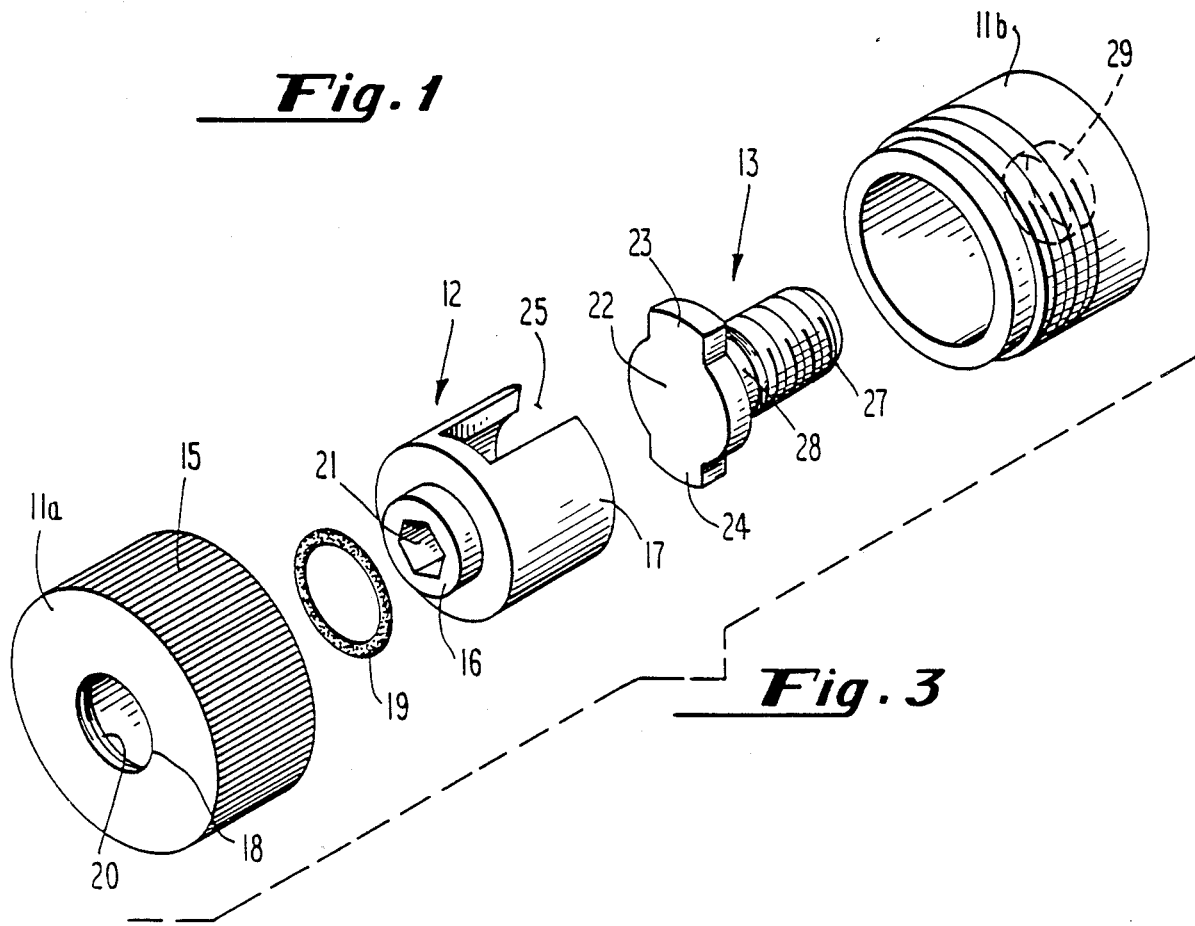
FIG. 3 is an exploded perspective view of the embodiment of the screw co illustrated in FIG. 1.

With reference first being made to FIGS. 1-3, the screw component 10 comprises a housing 11, a drive sleeve 12, and a screw member 13. The screw component 10 is adapted to be affixed within a suitable outer closure member, such as a panel 14, by press fit or by the use of a suitable adhesive compound.

In the embodiment illustrated in FIGS. 1-3 and 7-8, housing 11 is of two-piece construction comprising a cap portion 11a in threaded relation to a body portion 11b. To facilitate the attachment of housing 11 within panel 14, the cap portion 11a of housing 11 may be provided with a knurled circumferential surface 15. In this embodiment, the body portion 11b of the housing can be unscrewed and removed from cap portion 11a, and thereby allow removal and replacement of the drive sleeve, the screw member and/or the O-ring without the need to remove cap portion 11a and without damage to the panel 14.

The drive sleeve 12 is disposed within housing 11 for rotational movement therein and has a head portion 16 and a body portion 17. The head portion 16 of drive sleeve 12 is disposed through an aperture 18 in housing 11 so as to be accessible from the outside of panel 14. An O-ring seal 19 is disposed within an annular recess 20 in the housing cap 11a to seal the screw component from environmental contaminants. A tool-receiving recess 21 is also provided on head portion 16 of drive sleeve 12 to facilitate the rotation of drive sleeve 12.

The screw member 13 is comprised of a head 22 which is adapted to be received in body portion 17 of drive sleeve 12, a threaded shank 27, and a reduced diameter throat 28 connecting shank 27 to the head 22.

In the embodiment illustrated in the Figures, head 22 of screw member 13 is provided with radial tabs 23,24 which are adapted to be received in longitudinal slots 25,26 in body 17 of drive sleeve 12. Although the radial tab and corresponding slot configuration is preferred for purposes of ease in manufacture, it is to be understood that any mating configuration between body 17 and screw head 22 is acceptable. For example, screw head 22 may be of the known hexagonal shape and body 17 of drive sleeve 12 may have a hexagonal socket-type configuration. Whatever the particular configurations of body 17 and screw head 22, the mating arrangement between the two is such that screw member 13 rotates with the drive sleeve 12 and is driven axially to an extended position relative to housing 11 by virtue of a threaded aperture 29 in body 11b of housing 11, which is in threaded engagement with shank 27 of screw member 13. The operation of the screw component is more fully described below with reference to FIGS. 7 and 8.

Figure 4:
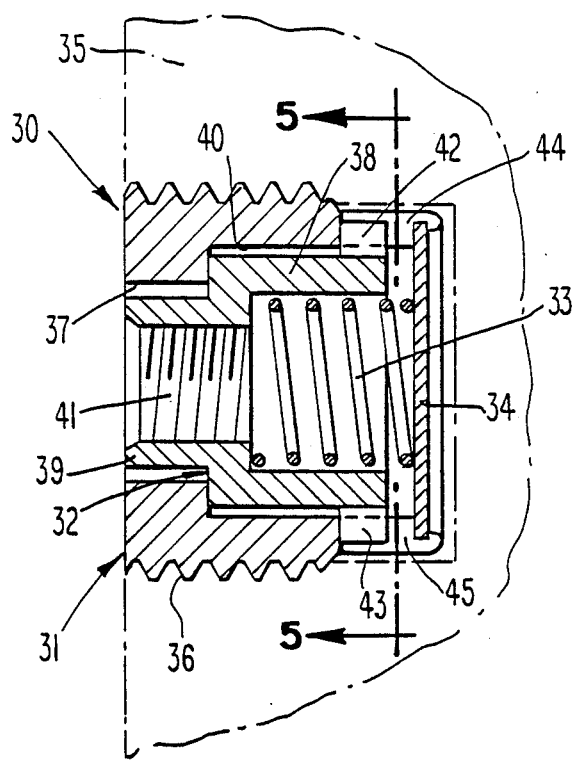
FIG. 4 is a sectional view of the nut component of the invention within an inner closure member.
Figure 5:
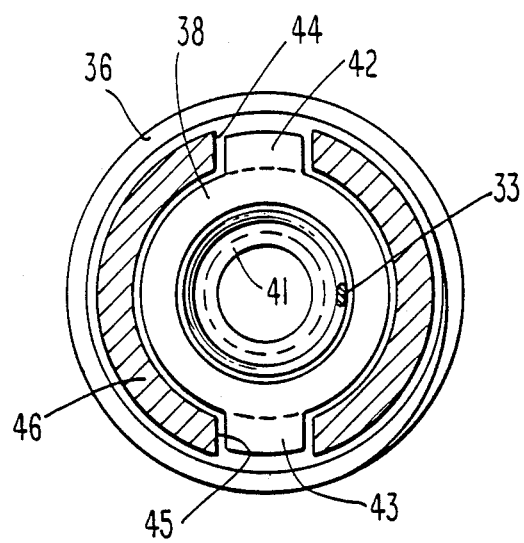
FIG. 5 is a sectional view of the nut component of the invention along line 5—5 of FIG. 4.
Figure 6:
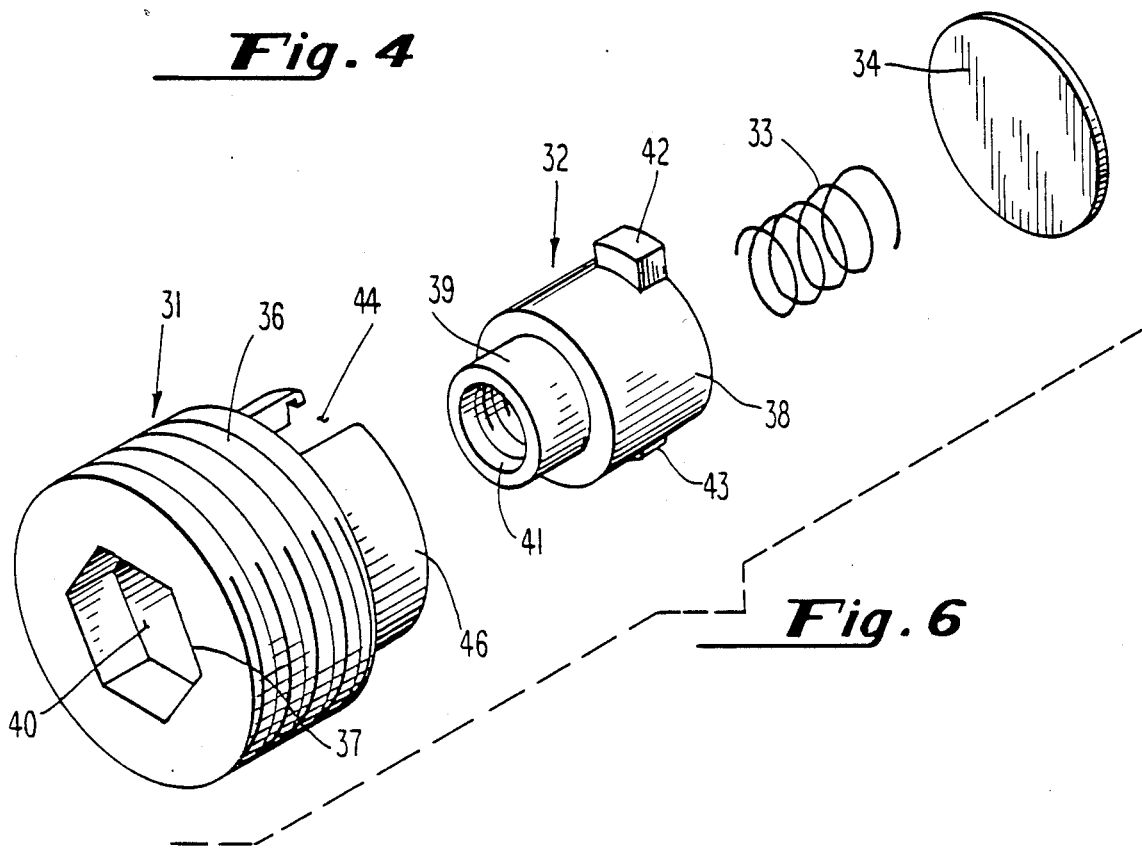
FIG. 6 is an exploded perspective view of the nut component of the present invention.

With reference now being made to FIGS. 4-6, the nut component 30 of the present invention comprises a shell 31, a nut member 32, a spring 33, and a disk 34, and is adapted to be affixed to an inner closure member, such as frame 35 in FIG. 4. To facilitate the attachment of nut component 30 to the frame 35, the shell 31 is provided with a threaded exterior surface 36. In the event that the frame 35 is not suitable for tapping, a tapped insert (not shown) may be press fit or bonded to the frame and the nut component 30 then threaded within the tapped insert. The face of shell 31 is provided with a tool-receiving aperture 37 to facilitate the mounting of the nut component to the frame.

As seen in the Figures, nut member 32 is of a generally cylindrical configuration having a body 38 and a reduced diameter neck 39, so that the nut member 32 has a stepped cross-sectional configuration (see FIG. 4). The body 38 of nut member 32 is adapted to be received within a cavity 40 in shell 31 and is capable of limited radial movement within the shell 31. When assembled, the neck 39 of nut member 32 is disposed within the tool-receiving aperture 37 of shell 31. The significance of the radial movement of nut member 32 will be discussed more fully below with respect to the operation of the fastener.

The neck 39 of nut member 32 is provided with a tapped bore 41 adapted to receive the shank 27 of screw member 13. The opening of tapped bore 41 is slightly bevelled outwardly to facilitate the alignment of the bore 41 with the advancing shank 27.

The nut member 32 is fixed against rotation by virtue of radial tabs 42,43 provided on the body 38 of nut member 32, being disposed within longitudinal slots 44,45 provided in an axial extension 46 of shell 31 (see FIG. 5). As mentioned above with reference to the screw component, it is to be understood that the configuration of the nut member and the shell is not limited to the tabs and mating slots shown in the Figures. It is to be further understood that other suitable mating configurations between the nut member 32 and extension 46 may be employed to fix the nut member 32 against rotation. Biasing means, such as coil spring 33, is provided to urge the nut member 32 against the shell 31 and controls the axial movement of the nut member 32, as more fully described below. A disk 34 is also provided and functions as the back wall of the shell 31.

With reference to FIGS. 7 and 8, the operation of the invention will now be described. First, the screw and nut components are attached to the panel and frame, respectively. The screw component may be mounted in a stepped aperture in the panel by press-fit or by the use of an adhesive. The nut component may be threaded to a tapped hole in the frame by use of a suitable tool disposed in the aperture 37. Insertion of a tool in aperture 37 is facilitated by the axial float of the nut member against the bias of the spring. Once the screw and nut components of the fastener are attached to the respective closure members, the panel 14 is positioned in the frame 35 for assembly. As seen in the Figures, the screw and nut components of the fastener are positioned in the closure members so as to be in substantial alignment when the panel is placed in the frame.

To secure the panel 14 in place, the screw component 10 is actuated by rotating the drive sleeve 12 in a clockwise direction indicated by arrow 50. This rotation is accomplished by use of a suitable tool 51 disposed within the tool-receiving recess 21 of head portion 16 of drive sleeve 12. By virtue of the cooperative engagement of drive sleeve 12 with screw member 13, the screw member 13 will rotate simultaneously with drive sleeve 12.

The rotation of screw member 13, in turn, will cause screw member 13 to be driven axially toward the nut component 30 due to the engagement of shank 27 of screw member 13 in the threaded aperture 29 in housing 11. Screw member 13 continues to be driven in the axial direction to a point where it contacts the neck 39 of nut member 32. At this point, the "float" of the nut member 32 becomes important.

As the shank 27 of screw member 13 continues to advance in the axial direction, the nut member 32 will shift slightly, or "float", in the radial direction to the point where the shank 27 is aligned with the tapped bore 41 in the neck 39 of nut member 32. In addition, the nut member will shift, or "float", in the axial direction, against the force of the spring 33, until the rotating threads of shank 27 are precisely aligned with the threads in the tapped bore 41 in neck 39 of nut member 32. FIG. 7 illustrates this last mention axial "float" of the nut member.

Upon further rotation and axial advancement of screw member 13, the threads of shank 27 will mate with the threads of tapped bore 41 and the panel 14 will be securely attached to the frame 35 as shown in FIG. 8. The stepped configuration of the nut member 32 against the cavity 40 and aperture 37 provide strength against tensile loading on the fastener.

When it is desirable to remove the panel 14, the tool 51 is again used to rotate the drive sleeve 12 in the opposite direction; i.e., counter-clockwise. Screw member 13 will then rotate with the drive sleeve 12, as mentioned above, and be driven axially into the housing 11, first by the threads in tapped bore 41, and then by the engagement with threaded aperture 29. The radial and axial float of the nut member 32 will again insure proper alignment of shank 27 in threaded aperture 29, and thus prevent binding upon disassembly. The panel 14 will thus become readily removable once screw member 13 has been fully retracted into the housing 11.

As seen from FIGS. 1, 7 and 8, the drive sleeve 12 does not move in the axial direction during operation of the fastener and thus remains in its original, flush mounted position relative to the outside surface of panel 14. As also seen from these Figures, the screw member 13 is fully retracted into housing 11 when the panel is removed, and thus eliminates any problems otherwise presented by protruding screws.

With respect to the alternate embodiment of the screw component 110 of the present invention illustrated in FIG. 9, this is essentially the same as the preferred embodiment depicted in the other Figures with the exception of the housing 111. In this embodiment, housing 111 comprises a one-piece unit having a rotatably mounted drive sleeve 112 and a screw member 113 disposed therein. An O-ring seal 114 is provided to seal the drive sleeve 112 with housing 111 and a second seal 115 is provided to seal the screw component with the inside surface of the panel. The function and operation of this embodiment is identical to that described above and is merely provided for use in those situations in which the removal and replacement of the internal working components of the screw component is not thought to be desirable.

Figure 10:
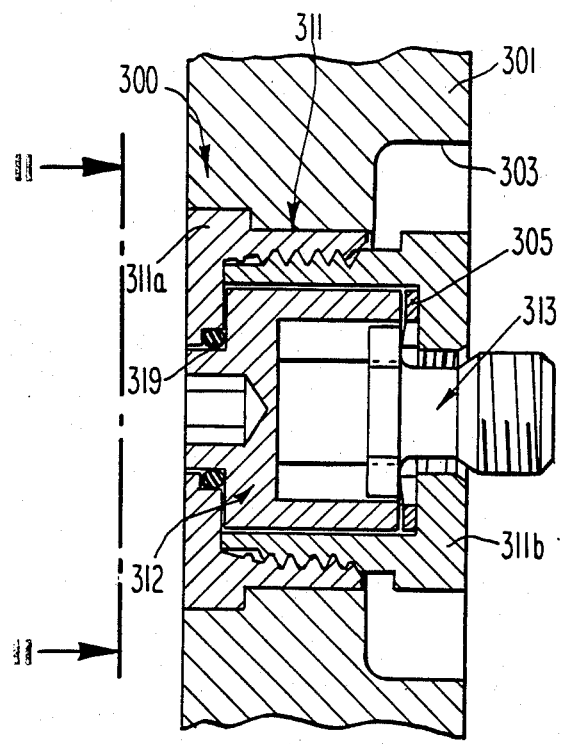
FIG. 10 a sectional view of a preferred embodiment of the screw component of the invention retained within an outer closure member.
Figure 11:
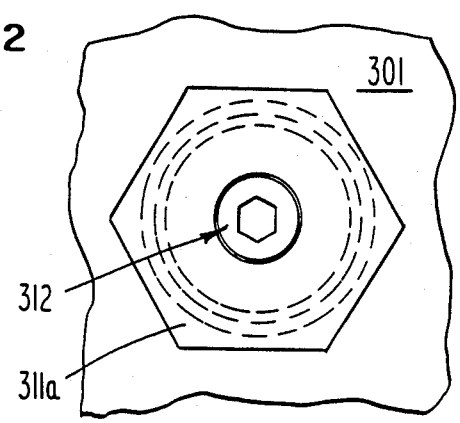
FIG. 11 a front elevational view of the face of the screw component as seen along line 11—11 of FIG. 10, shown in a reduced scale.
Figure 12:
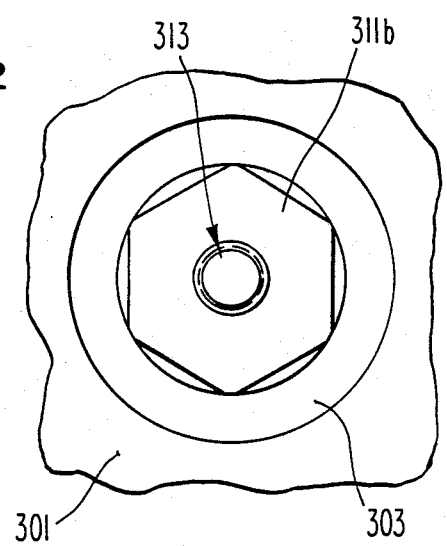
FIG. 12 is a rear elevational view of the screw component of FIG. 10, as viewed along line 12—12 of FIG. 10, also shown on a reduced scale.

With reference to FIGS. 10-13, the preferred embodiment of the invention comprises a screw component 300 and a nut component 400, each of which is adapted to be affixed to the respective closure members, such as panel 301 and frame 401. As seen in FIGS. 10-12, the preferred embodiment of the screw component 300 comprises a housing 311 having a cap portion 311a in threaded engagement with a body portion 311b. As seen in FIGS. 11 and 12, respectively, the external configuration of the cap and body portions of housing 311 are hexagonal-shaped. The hexagonal configuration of cap 311a is preferred because it has a greater resistance to rotation when affixed to panel 301, which in turn facilitates the assembly and disassembly of housing 311 without damage to the panel. The body portion 311b of housing 311 is preferably of hexagonal configuration to facilitate the rotation of body 311b by use of variety of standard wrenches or sockets. As seen in FIG. 10, a circular recess 303 may be provided on the inside surface of panel 301 to accommodate a socket-type tool when it is desired to disassemble and/or reassemble housing 311.

The remaining components of the screw component 300 are essentially the same as that described above, and comprise a drive sleeve 312, a screw member 313, and an O-ring 319. A lock washer 305 may also be provided, disposed between the drive sleeve 312 and body 311b of housing 311, which resists loosening of the drive sleeve and screw member when the panel is subjected to vibration.

Figure 13:
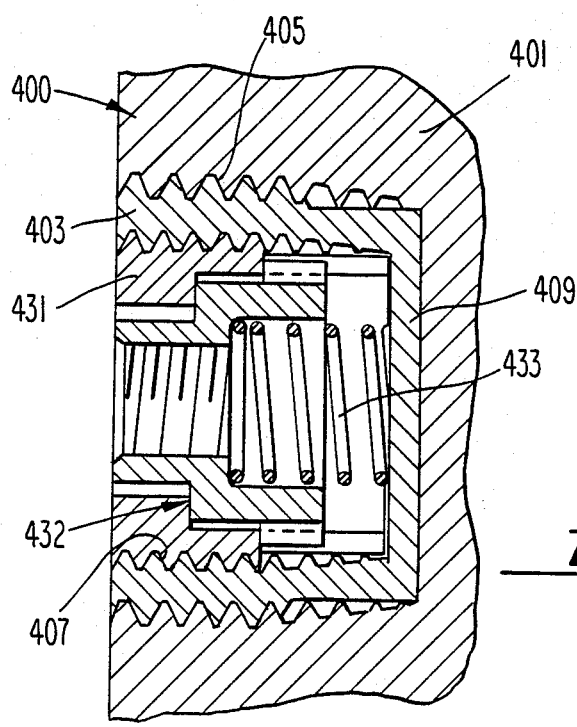
FIG. 13 is a sectional view of a preferred embodiment of the nut component of the invention, shown retained in an inner closure member.

With reference to FIG. 13, the preferred embodiment of nut component 400 comprises a shell 431, a nut member 432 and biasing means, such as coil spring 433, which are essentially the same as that described above with reference to the other embodiments. In addition, a nut housing 403 is provided which is of substantially U-shaped cross-sectional configuration, as seen in FIG. 13. Nut housing 403 is provided with a threaded external surface 405 and a tapped internal surface 407. Upon installation of nut component 400, threaded surface 405 is in threaded engagement with the frame 401, and shell 431 is in threaded engagement with surface 407. Housing 403 has a back wall portion 409 which performs the function of disk 34 in the previous embodiments and, accordingly, this embodiment of the nut component does not have a disk.

In the arrangement just described, it can be seen that the working elements of the nut component can be readily disassembled and re-assembled with housing 403 without damaging the frame 401 and, therefore, housing 403 may be permanently engaged with frame 401, if desired.

The foregoing description of the embodiments of the present invention is for purposes of illustration and is not intended to be a limitation of the invention, and it is to be understood that various modifications or equivalents may suggest themselves, all of which are within the spirit and scope of the present invention as defined by the appended claims.

What is claimed is:

1. A captive fastener for use in securing two closure members together, comprising:
   (a) a housing adapted to be affixed to one of the closure members;
   (b) a socket-like drive sleeve disposed within said housing for rotational movement therein;
   (c) a one-piece screw member disposed within said drive sleeve and in mating engagement therewith, whereby said screw member is rotatably movable in response to rotation of said drive sleeve;
   (d) a shell adapted to be affixed to the other closure member; and
   (e) a nut member disposed within said shell and fixed against rotation, said nut member having a tapped aperture adapted to receive said screw member;
   wherein upon rotation of said drive sleeve, said screw member is axially driven between extended and retracted positions relative to said housing and said drive sleeve.

2. The fastener of claim 1, wherein said drive sleeve further comprises a head portion disposed within an aperture in an outer face of said housing, said head portion being flush mounted with the outer face of said housing during the rotation of said drive sleeve.

3. The fastener of claim 2, wherein said head portion of said drive sleeve is provided with an aperture adapted to receive a tool therein to facilitate the rotation of said drive sleeve.

4. The fastener of claim 1, wherein said nut member is disposed within said shell for limited axial movement therein, and further comprising biasing means for biasing said nut member against said shell.

5. The fastener of claim 5, wherein said nut member is capable of limited movement in the radial directions within said shell.

6. The fastener of claim 1, wherein said housing comprises a cap portion and a body portion in threaded engagement with said cap portion.

7. The fastener of claim 1, wherein said drive sleeve is provided with a pair of diametrically opposed slots, said slots being engaged with diametrically opposed tabs on a head of said screw member.

8. A captive fastener for use in securing two closure members together, comprising:
   (a) a housing adapted to be affixed to one of the closure members;
   (b) a socket-like drive sleeve disposed within said housing for rotational movement therein;
   (c) a screw member disposed within said drive sleeve and in mating engagement therewith, whereby said screw member is rotatably movable in response to rotation of said drive sleeve;
   (d) a shell adapted to be affixed to the other closure member; and
   (e) a nut member disposed within said shell and fixed against rotation, said nut member having a tapped aperture adapted to receive said screw member;
   wherein said drive sleeve further comprises a head portion disposed within an aperture in an outer face of said housing, said head portion being flush mounted with the outer face of said housing during the rotation of said drive sleeve, wherein said screw member is axially driven between extended and retracted positions relative to said housing and said drive sleeve in response to the rotation of said drive sleeve.

9. The fastener of claim 8, wherein said head portion of said drive sleeve further comprises an aperture adapted to receive a tool to facilitate the rotation of said drive sleeve.

10. The fastener of claim 8, wherein said nut member is disposed within said shell for limited axial movement therein, and further comprising biasing means for biasing said nut member against said shell.

11. The fastener of claim 10, wherein said nut member is capable of limited movement in the radial directions within said shell.

12. The fastener of claim 8, wherein said housing comprises a cap portion and a body portion in threaded engagement with said cap portion.

13. The fastener of claim 8, wherein said drive sleeve is provided with a pair of diametrically opposed slots, said slots being engaged with diametrically opposed tabs on a head of said screw member.

14. A captive fastener for use in securing two closure members together, comprising:
   (a) a housing adapted to be affixed to one of the closure members;
   (b) a socket-like drive sleeve disposed within said housing for rotational movement therein;
   (c) a screw member disposed within said drive sleeve and in mating engagement therewith, whereby said screw member is rotatably movable in response to rotation of said drive sleeve;
   (d) a shell adapted to be affixed to the other closure member; and
   (e) a nut member disposed within said shell and fixed against rotation, said nut member having a tapped aperture adapted to receive said screw member;
   wherein said nut member is disposed within said shell for limited movement in the axial and radial directions to facilitate alignment and engagement of said tapped aperture with said screw member; and further comprising biasing means for biasing said nut member against said shell.

15. The fastener of claim 14, wherein said screw member is axially driven between extended and retracted positions relative to said housing and said drive sleeve in response to the rotation of said drive sleeve.

16. The fastener of claim 15, wherein said drive sleeve comprises a head portion disposed within an aperture in an outer face of said housing, said head portion being flush mounted with the outer face of said housing during rotation of said drive sleeve, and wherein said head portion is provided with an aperture adapted to receive a tool therein to facilitate the rotation of said drive sleeve.

17. The fastener of claim 14, wherein said drive sleeve is provided with a pair of diametrically opposed slots, said slots being engaged with diametrically opposed tabs on a head of said screw member.

18. A captive fastener for use in securing two closure members together, comprising:
   (a) a screw component comprising:
      (1) a housing adapted to be affixed to one of the closure members;
      (2) a drive sleeve disposed within said housing for rotational movement therein;
      (3) a screw member disposed within said housing and in mating engagement with said drive sleeve, said screw member being rotatable in response to rotation of said drive sleeve, wherein said screw member is axially driven between extended and retracted positions relative to said housing in response to the rotation of said screw member; and (4) wherein said drive sleeve is flush mounted with an outer face of said housing and remains flush mounted during the rotation thereof; and (b) a nut component comprising:
 (1) a housing adapted to be affixed to the other closure member;
 (2) a shell in threaded engagement with said housing;
 (3) a nut member disposed within said shell and fixed against rotation, said nut member having a tapped aperture adapted to receive said screw member;
 (4) wherein said nut member is capable of limited movement in the axial and radial directions within said shell; and
 (5) biasing means disposed within said shell for biasing said nut member against said shell and towards said screw component.

19. The fastener of claim 18, wherein said drive sleeve comprises a substantially socket-like member having a pair of diametrically opposed slots, said slots being engaged with diametrically opposed tabs on the head of said screw member.

20. The fastener of claim 19, wherein said housing comprises a cap portion and a body portion in threaded engagement with said cap portion.

* * * * *

UNITED STATES PATENT OFFICE
CERTIFICATE OF CORRECTION

Patent No. __4,863,326__    Dated __September 5, 1989__

Inventor(s)   James H. Vickers

It is certified that error appears in the above-identified patent and that said Letters Patent is hereby corrected as shown below:

On the title page:
<u>In The Abstract</u>

Line 2, "crew" should be --screw--;

Column 1, line 64, "he" should be --the--;
Column 2, line 68, "co" should be --component--;
Column 3, line 2, after "invention" and before "within", the word --retained-- should be inserted;
Column 3, line 4, after "invention" and before "along", the word --taken-- should be inserted;
Column 7, line 36, after "claim" and before "wherein", the number "5" should be a --4--.

Signed and Sealed this

Fourteenth Day of August, 1990

*Attest:*

HARRY F. MANBECK, JR.

*Attesting Officer*    *Commissioner of Patents and Trademarks*